US010666853B2

(12) United States Patent
Tomita

(10) Patent No.: US 10,666,853 B2
(45) Date of Patent: May 26, 2020

(54) VIRTUAL MAKEUP DEVICE, AND VIRTUAL MAKEUP METHOD

(71) Applicant: PANASONIC INTELLECTUAL PROPERTY MANAGEMENT CO., LTD., Osaka (JP)

(72) Inventor: Hiroto Tomita, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/306,276

(22) PCT Filed: May 16, 2017

(86) PCT No.: PCT/JP2017/018311
§ 371 (c)(1),
(2) Date: Nov. 30, 2018

(87) PCT Pub. No.: WO2017/212878
PCT Pub. Date: Dec. 14, 2017

(65) Prior Publication Data
US 2019/0297271 A1 Sep. 26, 2019

(30) Foreign Application Priority Data
Jun. 10, 2016 (JP) ................................ 2016-116340

(51) Int. Cl.
*H04N 5/232* (2006.01)
*G06T 11/60* (2006.01)
(Continued)

(52) U.S. Cl.
CPC ......... *H04N 5/232127* (2018.08); *G06T 1/00* (2013.01); *G06T 7/70* (2017.01);
(Continued)

(58) Field of Classification Search
None
See application file for complete search history.

(56) References Cited

U.S. PATENT DOCUMENTS 6,502,583 B1 * 1/2003 Utsugi ..................... A61K 8/02 132/200
7,555,148 B1 * 6/2009 Steinberg .............. G06F 16/583 382/118
(Continued)

FOREIGN PATENT DOCUMENTS

CN 104797165 A 7/2015
JP 2001-204545 A 7/2011
JP 2013-101633 A 5/2013

OTHER PUBLICATIONS

Official Communication issued in International Pat. Appl. No. 2017/018311, dated Aug. 15, 2017.
(Continued)

*Primary Examiner* — Jayanti K Patel
*Assistant Examiner* — Stefan Gadomski
(74) *Attorney, Agent, or Firm* — Greenblum & Bernstein, P.L.C.

(57) ABSTRACT

A virtual makeup device includes a display controller that receives a makeup specifying operation for specifying a content of a virtual makeup on a face image imaged by a camera having an autofocus function in a state where the face image is displayed, and a camera controller that causes the camera to start an autofocus operation on condition that a predetermined makeup specifying operation is performed.

19 Claims, 7 Drawing Sheets

(51) Int. Cl.
*G06T 7/70* (2017.01)
*G06T 1/00* (2006.01)
*G06F 3/0482* (2013.01)

(52) U.S. Cl.
CPC ............ *G06T 11/60* (2013.01); *H04N 5/232* (2013.01); *H04N 5/232125* (2018.08); *G06F 3/0482* (2013.01); *G06T 2200/24* (2013.01); *G06T 2207/30201* (2013.01)

(56) References Cited

U.S. PATENT DOCUMENTS 9,449,412 B1* 9/2016 Rogers .................... G06T 11/60
2005/0062872 A1* 3/2005 Nakashima ........ H04N 5/23212 348/349
2006/0012702 A1* 1/2006 Kawahara .......... H04N 5/23212 348/345
2006/0268101 A1* 11/2006 He ......................... H04N 7/147 348/14.12
2007/0019882 A1* 1/2007 Tanaka .................... G06T 17/20 382/276
2007/0189627 A1* 8/2007 Cohen ................ G06K 9/00228 382/254
2007/0258656 A1* 11/2007 Aarabi ............... G06K 9/00228 382/254
2008/0055730 A1* 3/2008 Lin .................... G02B 27/0093 359/602
2008/0107411 A1* 5/2008 Hope ....................... G02B 7/28 396/121
2008/0226278 A1* 9/2008 Garg ........................ G02B 7/34 396/123
2008/0267443 A1* 10/2008 Aarabi ............... G06K 9/00234 382/100
2009/0231454 A1* 9/2009 Miura ................ H04N 5/23212 348/220.1
2010/0066822 A1* 3/2010 Steinberg ........... G06K 9/00208 348/77
2010/0220933 A1* 9/2010 Takano ................ A45D 44/005 382/224
2010/0226531 A1* 9/2010 Goto ....................... G06T 11/00 382/103
2010/0288295 A1* 11/2010 Kamada .................. G06T 11/00 132/200
2012/0014607 A1* 1/2012 Jeson ................. H04N 5/23219 382/190
2012/0029417 A1* 2/2012 Samain .................... A61K 8/49 604/20
2012/0099756 A1* 4/2012 Sherman ................ G06Q 30/06 382/100
2012/0223956 A1* 9/2012 Saito .................... A45D 44/005 345/582
2012/0257000 A1 10/2012 Singhal
2012/0299945 A1* 11/2012 Aarabi ............... G06K 9/00281 345/589
2012/0308124 A1* 12/2012 Belhumeur ........ G06K 9/00281 382/159
2013/0169827 A1* 7/2013 Santos ............... H04N 5/23229 348/207.1
2013/0176414 A1* 7/2013 Hwang ................. G01S 17/026 348/77
2013/0258118 A1* 10/2013 Felt ...................... A45D 44/005 348/207.1
2014/0016823 A1* 1/2014 Ye ........................... G06T 19/20 382/103
2014/0160019 A1* 6/2014 Anda ....................... G09G 5/00 345/158
2014/0210814 A1* 7/2014 Kim ........................ G06T 19/00 345/420
2014/0328509 A1* 11/2014 Guissin ................... G06T 5/002 382/100
2014/0359438 A1* 12/2014 Matsuki ................... G02B 7/36 715/702
2015/0049111 A1* 2/2015 Yamanashi ........... G06T 11/001 345/632
2015/0050624 A1* 2/2015 Yamanashi ............ A45D 44/00 434/100
2015/0118655 A1* 4/2015 Yamanashi ............ A45D 44/00 434/100
2015/0124155 A1* 5/2015 Li .......................... G03B 13/36 348/349
2015/0248581 A1 9/2015 Gouda et al.
2015/0254501 A1* 9/2015 Yamanashi ........ G06K 9/00268 348/78
2015/0264249 A1* 9/2015 Shoda ................ H04N 5/23212 348/349
2015/0339757 A1* 11/2015 Aarabi ................... G06Q 30/06 705/12
2015/0366328 A1* 12/2015 Tamura .................. A45D 44/00 434/100
2016/0042557 A1* 2/2016 Lin ........................... G06T 7/73 345/426
2016/0110587 A1* 4/2016 Han ................... G06K 9/00288
2016/0127691 A1* 5/2016 Bokowski ........ G08B 13/19656 348/159
2016/0328632 A1* 11/2016 Choe .................. H04N 5/23219
2016/0357578 A1* 12/2016 Kim ...................... G06T 11/001
2017/0006211 A1* 1/2017 Gurbuz ................ H04N 5/2226
2017/0026565 A1* 1/2017 Hong ...................... G06F 3/013
2017/0076474 A1* 3/2017 Fu ........................... G06T 11/00
2017/0255478 A1* 9/2017 Chou .................. G06F 17/5009
2018/0206618 A1* 7/2018 Nishi ..................... A45D 44/00
2018/0268572 A1* 9/2018 Nishi ......................... G06T 7/73
2019/0026907 A1* 1/2019 Abreu ...................... G06T 11/00
2019/0035149 A1* 1/2019 Chen ....................... G06T 15/04
2019/0122404 A1* 4/2019 Freeman .............. G06K 9/4652

OTHER PUBLICATIONS

English Translation of Chinese Search Report dated Apr. 9, 2020 for the related Chinese Patent Application No. 201780033963.3.

* cited by examiner

| FACE PART | EXTRACTION INFORMATION | REFERENCE FACE FEATURE POINT | AF AREA | ••• |
|---|---|---|---|---|
| LIPS | E1 | LEFT MOUTH CORNER, RIGHT MOUTH CORNER, ••• | F1 | ••• |
| EYES | E2 | INNER CORNER OF EYE, OUTER CORNER OF EYE, ••• | F2 | ••• |
| CHEEK BONE | E3 | CENTER OF PUPIL, CHIN, ••• | F3 | ••• |
| ⋮ | ⋮ | ⋮ | ⋮ | ••• |

| MAKEUP ITEM (421) | ITEM DETAILS (422) | COLOR (423) | DENSITY (424) | REFERENCE FACE FEATURE POINT (425) | PART AREA (426) | ... |
|---|---|---|---|---|---|---|
| LIPS (LIPS) | LIPSTICK | PINK | D11 | LEFT MOUTH CORNER, RIGHT MOUTH CORNER, ... | M11 | ... |
| | | BEIGE | | | | ... |
| | | ⋮ | | | | ... |
| | LIP GLOSS | ⋮ | D12 | | M12 | ... |
| | ⋮ | ⋮ | ⋮ | | ⋮ | ... |
| EYE MAKEUPS (EYES) | EYE SHADOW | BROWN | D21 | INNER CORNER OF EYE, OUTER CORNER OF EYE, ... | M21 | ... |
| | | ⋮ | | | | ... |
| | EYELINER | ⋮ | D22 | | M22 | ... |
| | ⋮ | ⋮ | ⋮ | | ⋮ | ... |
| BLUSHES (FACE) | BLUSH | ORANGE | D31 | CENTER OF PUPIL, CHIN ... | M31 | ... |
| | | ⋮ | | | | ... |
| | FACE SHADOW | ⋮ | D32 | | M32 | ... |
| | ⋮ | ⋮ | ⋮ | | ⋮ | ... |
| ⋮ | ⋮ | ⋮ | ⋮ | ⋮ | ⋮ | .. |

| MAKEUP ITEM | FACE PART |
|---|---|
| LIPS (LIPS) | LIPS |
| EYE MAKEUPS (EYES) | EYES |
| BLUSHES (FACE) | CHEEK BONE |
| ⋮ | ⋮ |

VIRTUAL MAKEUP DEVICE, AND VIRTUAL MAKEUP METHOD

TECHNICAL FIELD

The present disclosure relates to a virtual makeup device that performs a virtual makeup on a face image, and a virtual makeup method.

BACKGROUND ART

There is a technique relating to a so-called virtual makeup in which a virtual makeup is applied to an image obtained by imaging a face by image processing (refer to, for example, PTL 1). In the technique described in PTL 1, a still image of a face imaged by a camera having an autofocus function is displayed, and when a selection operation is performed on face parts such as eyes and lips, a color of a portion of the selected face part is replaced with a predetermined color. According to such a technique, it is possible to easily generate an image in which a makeup is virtually applied to the face part selected by a user.

Furthermore, in recent years, a technique related to a virtual makeup on moving images (hereinafter, referred to as "face image") obtained by imaging the face is actively developed (for example, refer to PTL 2). In the technique described in PTL 2, the position of the face part is tracked by using face feature points such as inner corners of the eyes and a mouth corner as tracking points, and the images of the makeup parts such as eye shadow and lipstick (hereinafter, referred to as "makeup part image") are continuously superimposed on a predetermined position of the face on the images. According to such a technique, the virtual makeup can be realized even in the face image in which the position and orientation of the face change moment by moment.

Incidentally, it is conceivable to generate and display an image reflecting the content of the operation in real time every time an operation specifying the content of the virtual makeup on the face image (hereinafter referred to as "makeup specifying operation") is performed. Such a virtual makeup is hereinafter simply referred to as "virtual makeup on face image".

On the other hand, when the face image to which the user pays attention is blurred, it may also cause discomfort to the user. Therefore, a technique that makes it possible to perform the virtual makeup on the face image more comfortably is desired.

The object of the present disclosure is to perform a virtual makeup on the face image more comfortably.

CITATION LIST

Patent Literature

PTL 1: Japanese Patent Unexamined Publication No. 2001-204545

PTL 2: Japanese Patent Unexamined Publication No. 2013-101633

SUMMARY OF THE INVENTION

A virtual makeup device of the present disclosure includes a display controller that receives a makeup specifying operation for specifying a content of a virtual makeup on a face image imaged by a camera having an autofocus function in a state where the face image is displayed, and a camera controller that causes the camera to start an autofocus operation on condition that a predetermined makeup specifying operation is performed.

A virtual makeup method of the present disclosure includes a step of starting display of a face image imaged by a camera having an autofocus function and receiving a makeup specifying operation for specifying a content of a virtual makeup on the face image, and a step of causing the camera to start an autofocus operation on condition that a predetermined makeup specifying operation is performed.

According to the present disclosure, the virtual makeup on the face image can be performed more comfortably.

BRIEF DESCRIPTION OF DRAWINGS

FIG. 4 is a diagram illustrating an example of a face part information table according to the present exemplary embodiment.

FIG. 5 is a diagram illustrating an example of a makeup item information table according to the present exemplary embodiment.

FIG. 6 is a diagram illustrating an example of an information correspondence table according to the present exemplary embodiment.

DESCRIPTION OF EMBODIMENT

Hereinafter, an exemplary embodiment of the present disclosure will be described in detail with reference to the drawings.

<Outline of Device>

First, an outline of a virtual makeup device according to a present exemplary embodiment will be described.

Figure 1:
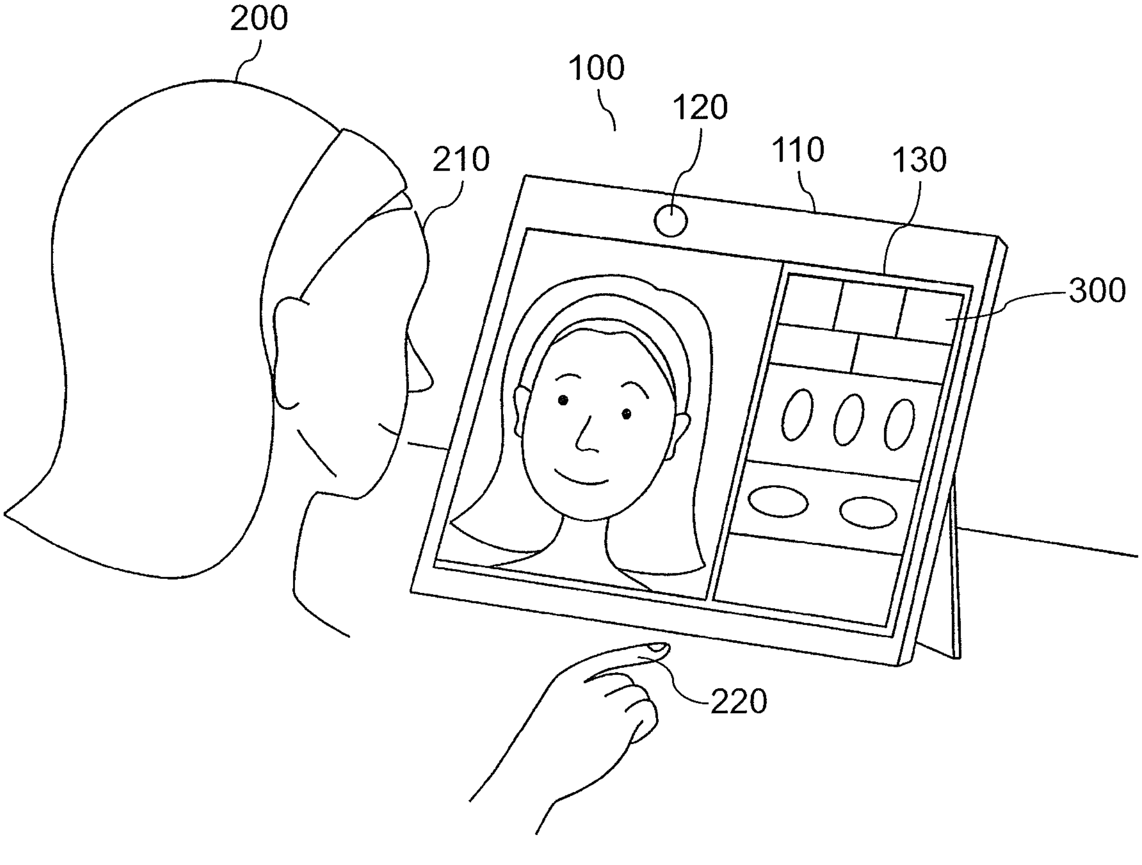
FIG. 1 is a view illustrating an example of a use state of a virtual makeup device according to an exemplary embodiment of the present disclosure.

FIG. 1 is a view illustrating an example of a use state of the virtual makeup device according to the present exemplary embodiment.

As illustrated in FIG. 1, virtual makeup device 100 is, for example, a tablet type terminal capable of standing on a desk. In virtual makeup device 100, camera 120 and display 130 with touch panel are disposed on a main surface of plate-like casing 110. Virtual makeup device 100 may further dispose a light on the main surface of casing 110.

A relative position between user 200 and virtual makeup device 100 is adjusted by user 200, for example, so that face 210 is displayed on camera 120, display 130 with touch panel can be viewed, and finger 220 touches display 130 with touch panel.

Camera 120 is a digital camera having an autofocus function and images an image of face 210 of user 200 (hereinafter referred to as "face image").

Display 130 with touch panel displays virtual makeup screen 300 which is a user interface for performing a virtual makeup on a face image.

Figure 2:
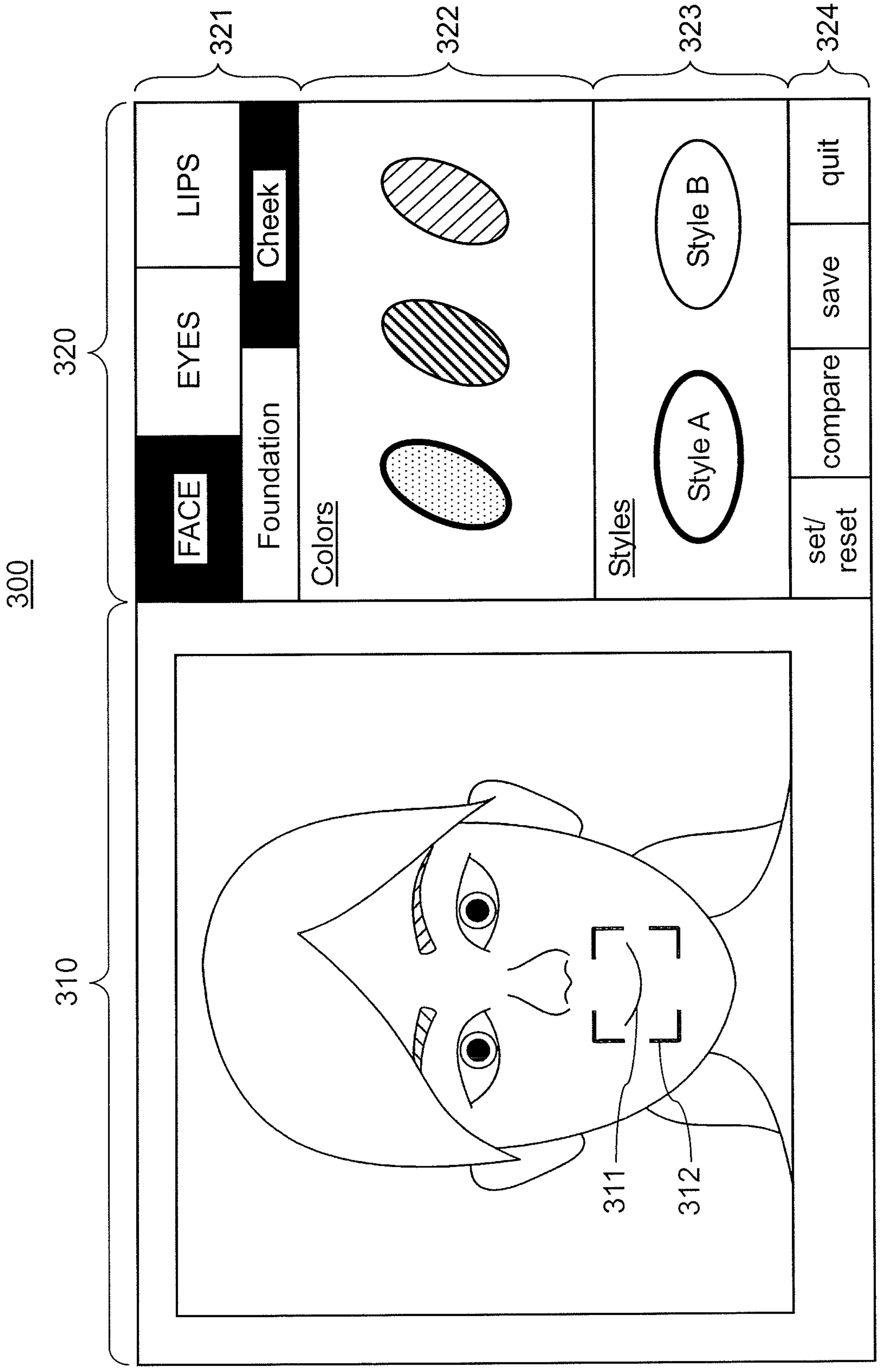
FIG. 2 is a diagram illustrating an example of a virtual makeup screen in the present exemplary embodiment.

FIG. 2 is a diagram illustrating an example of virtual makeup screen 300.

As illustrated in FIG. 2, virtual makeup screen 300 includes image display area 310 and operation reception area 320.

Image display area 310 displays a mirror image of the face image imaged by camera 120 (hereinafter simply referred to as "face image") in real time. In addition, image display area 310 superimposes and displays a makeup part image determined based on an operation in response to the operation on operation reception area 320 on the face image.

Here, "real time" is a concept including a delay time that is small enough to allow user 200 to feel a sense close to the feeling of watching the mirror. In addition, the makeup part image is an image illustrating a cosmetic condition when a makeup item (for example, lipstick or eye shadow) is applied to a corresponding face part (for example, lips or eyelid).

Operation reception area 320 includes, for example, item selection area 321, color selection area 322, style selection area 323, and process selection area 324.

Item selection area 321 accepts an operation of selecting a makeup item to be an operation target from among a plurality of makeup items predetermined. Item selection area 321 may hierarchically accept the selection operation with a main classification and a sub classification. Color selection area 322 accepts an operation of selecting a color to be applied to the makeup item from a plurality of colors predetermined for each makeup item. Style selection area 323 accepts an operation of selecting a shape to be applied to the makeup item from a plurality of makeup application shapes predetermined for each makeup item. That is, item selection area 321 to style selection area 323 accept an operation for specifying the content of the virtual makeup (hereinafter, referred to as "makeup specifying operation").

Process selection area 324 accepts an operation of selecting a process to be executed with respect to information indicating the content of the virtual makeup specified by a makeup specifying operation (hereinafter, referred to as "makeup specifying information"). Such a process includes a preview display of the makeup part image corresponding to the makeup specifying information, recording of the makeup specifying information, and the like.

Image display area 310 continues to display the imaged face image in real time. In this state, if an autofocus operation of camera 120 (refer to FIG. 1) is frequently performed, as described above, there is a possibility that the user may feel uncomfortable. Therefore, virtual makeup device 100 starts the autofocus operation of camera 120 on condition that a predetermined makeup specifying operation is performed, and does not perform the autofocus operation unnecessarily when the operation is not performed.

For example, virtual makeup device 100 sequentially determines whether or not the operation of selecting the makeup item (hereinafter, referred to as "item selection operation") is performed in item selection area 321. When the item selection operation is performed, virtual makeup device 100 performs a focusing operation of camera 120 with face part (for example, lips) 311 corresponding to a selected makeup item (for example, lipstick) as a focus position. Virtual makeup device 100 may superimpose and display focus frame 312 indicating the focus position on the face image of process selection area 324.

In a case where user 200 (refer to FIG. 1) intends to start a virtual makeup of, for example, lips (LIP), first, a lipstick is selected in item selection area 321. As a result, virtual makeup device 100 instantly focuses on the lips serving as the face part corresponding to the lipstick, and displays the face image in which the lips to which user 200 pays attention are clearly displayed.

That is, virtual makeup device 100 makes it possible to clearly display the face part to which user 200 pays attention as a virtual makeup target while avoiding the troubles caused by unnecessary autofocus operation.

Hereinafter, a configuration and an operation of virtual makeup device 100 will be described in detail.

<Configuration of Device>

First, the configuration of virtual makeup device 100 will be described.

Figure 3:
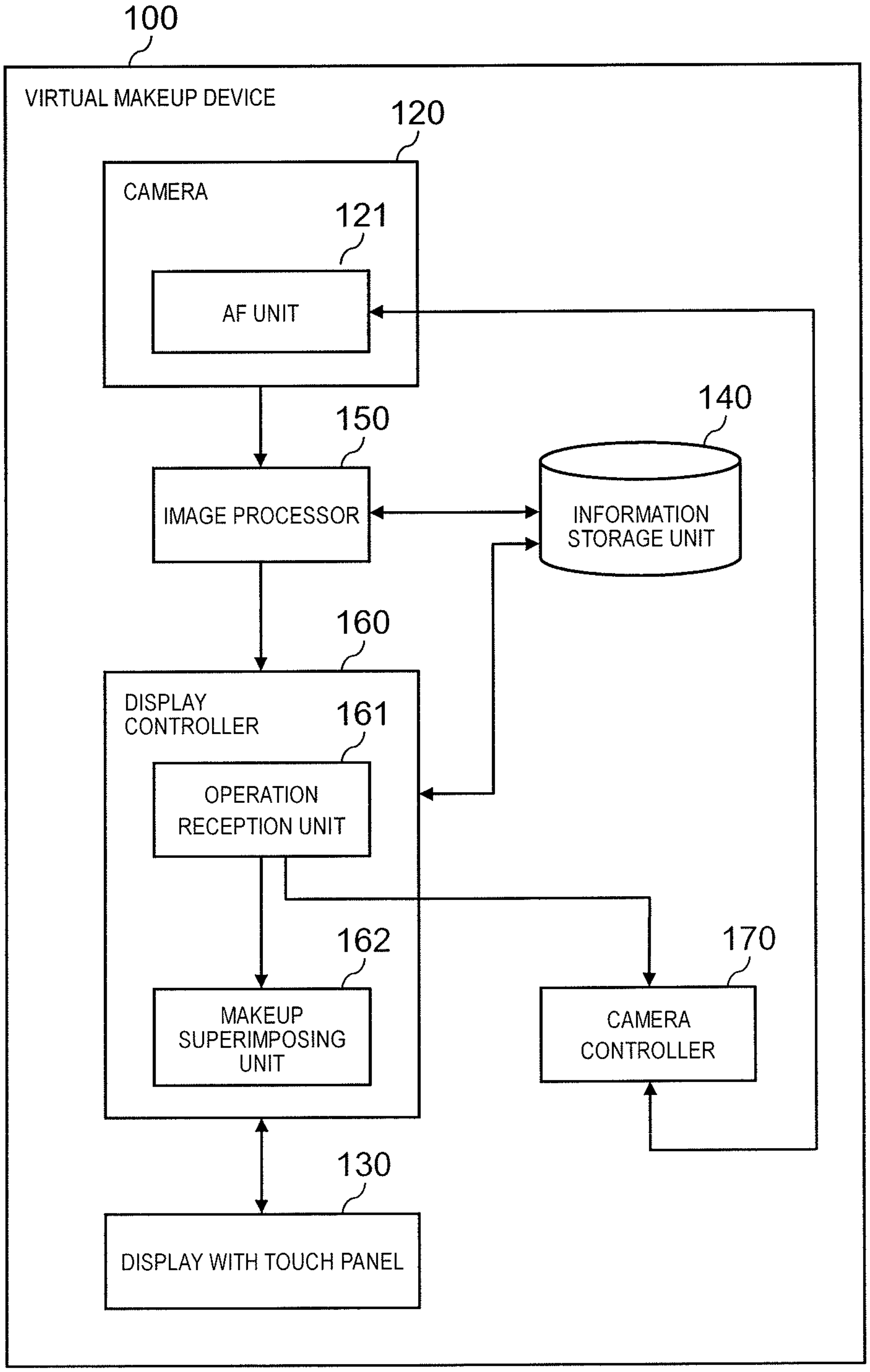
FIG. 3 is a block diagram illustrating an example of a configuration of the virtual makeup device according to the present exemplary embodiment.

FIG. 3 is a block diagram illustrating an example of the configuration of virtual makeup device 100.

In FIG. 3, virtual makeup device 100 includes camera 120, display 130 with touch panel, information storage unit 140, image processor 150, display controller 160, and camera controller 170.

Camera 120 is a digital camera having an optical system, a shutter mechanism, and an image pickup device, images the face image, and outputs stream data of the obtained face image to image processor 150. The process of inverting the face image in a lateral direction may be performed in camera 120 or may be performed in image processor 150 or display controller 160 in the subsequent stage.

In addition, camera 120 has auto focus (AF) unit 121. When the focus position is specified from camera controller 170 described later, AF unit 121 performs a focusing operation of focusing on such position. Camera 120 performs imaging irrespective of the presence or absence of the focusing operation and outputs image stream data.

Display 130 with touch panel includes, for example, a liquid crystal display and a transparent touch panel disposed on the surface thereof. When user's finger 220 is in contact with display 130 with touch panel, display 130 with touch panel detects such a contact and outputs operation information indicating with which area finger 220 is in contact to display controller 160. In addition, display 130 with touch panel displays various images and images such as above virtual makeup screen 300 (refer to FIG. 2) under the control of display controller 160 by inputting an image signal or the like, for example.

Information storage unit 140 stores various pieces of information necessary for each unit of virtual makeup device 100 to operate. For example, information storage unit 140 previously stores a face part information table, a makeup item information table, and an information correspondence table.

FIG. 4 is a diagram illustrating an example of the face part information table.

As illustrated in FIG. 4, face part information table 410 describes extraction information 412, reference face feature point 413, AF area 414, and the like for each face part 411.

Extraction information 412 is information for extracting the face part from the face image, and is, for example, an image feature of an image area including the face part. Reference face feature point 413 is one or a plurality of face feature points, which is a reference of an area occupied by the face part on the face image, among the face feature points. AF area 414 is an area to be a focus determination target when focusing on the face part, which determined based on reference face feature point 413.

For example, extraction information 412 of "E1", reference face feature point 413 of "left mouth corner, right mouth corner, . . . ", and AF area 414 of "F1" are described in association with face part 411 of "lips". This prescribes that extraction information E1 is used in a case of extracting lips from the face image, and that search of a peak position of the contrast is performed using area F1 determined based on the face feature points such as a left mouth corner and a right mouth corner in a case of focusing on lips.

FIG. 5 is a diagram illustrating an example of the makeup item information table.

As illustrated in FIG. 5, makeup item information table 420 describes color 423, density 424, reference face feature point 425, and part area 426 for each combination of makeup item 421 and item details 422 serving as details of the makeup item (hereinafter, simply referred to as "makeup item").

Color 423 is the color of the makeup part image of the makeup item. Density 424 is the transparency when superimposing the makeup part image on the face image. Reference face feature point 425 is one or a plurality of face feature points, which are the reference of the area occupied by the makeup part image on the face image, among the face feature points. Part area 426 is an area determined based on reference face feature point 425 and occupied by the makeup part image on the face image.

For example, color 423 of "pink", density 424 of "D11", reference face feature point 424 of "left mouth corner, right mouth corner, . . . " and part area 426 of "M11" are described, in association with item details 422 of "lipstick" of makeup item 421 of "LIPS". In a case where pink is selected as the color of lipstick, this prescribes that area M11 determined based on face feature point such as the left mouth corner or the right mouth corner of the face image as a reference, and an image that occupies pink of density D11 are used as the makeup part images.

FIG. 6 is a diagram illustrating an example of the information correspondence table.

As illustrated in FIG. 6, information correspondence table 430 describes face part 432 to be applied to makeup item 431 for each makeup item 431. That is, when there is makeup item 431 selected by user 200 as a virtual makeup target, information correspondence table 430 describes which face part 432 has a high possibility that user 200 pays attention. Makeup item 431 corresponds to makeup item 421 described in makeup item information table 420 (refer to FIG. 5), and face part 432 corresponds to face part 411 described in face part information table 410 (refer to FIG. 4).

For example, face part 432 of "lips" is associated with makeup item 421 of "lips". This specifies that the lips are to be applied to the lips. In other words, such association indicates that the lips need to be focused when the lips are selected as targets of virtual makeup.

Image processor 150 of FIG. 3 sequentially extracts the face parts such as lips and eyes from the stream data of the face image based on extraction information 412 (refer to FIG. 4) of face part information table 410. Image processor 150 outputs the stream data of the face image to display controller 160 and sequentially outputs information indicating the position of each face part including the reference face feature point (hereinafter, referred to as "part position information"). As a method of extracting the face feature point by image processor 150, known methods such as the methods described in PTL 1 and PTL 2 can be adopted.

Display controller 160 generates virtual makeup screen 300 (refer to FIG. 2) including the face image based on the stream data of the face image, the operation information, and the part position information, and causes display 130 with touch panel to display. Display controller 160 includes operation reception unit 161 and makeup superimposing unit 162.

In a state where the face image is displayed on display 130 with touch panel, operation reception unit 161 receives a makeup specifying operation. That is, operation reception unit 161 generates and displays operation reception area 320 of virtual makeup screen 300, and determines the operation performed on operation reception area 320 based on the operation information. Every time the makeup specifying operation is performed, operation reception unit 161 outputs information indicating the operation content to makeup superimposing unit 162. In addition, when a predetermined makeup specifying operation is performed, operation reception unit 161 notifies camera controller 170 of the fact.

The predetermined makeup specifying operation is an operation indicating that there is a high possibility that user 200 pays attention to any part of the face image as a target of the virtual makeup. In the present exemplary embodiment, the predetermined makeup specifying operation is the above item selection operation. When the item selection operation is performed, operation reception unit 161 outputs information indicating the selected makeup item (hereinafter, referred to as "selected item information") to camera controller 170.

Makeup superimposing unit 162 displays the real-time face image on image display area 310 of virtual makeup screen 300 based on the stream data of the face image. In addition, makeup superimposing unit 162 generates a makeup part image and superimposes the image on the face image based on the part position information and makeup item information table 420 (refer to FIG. 5) according to the presence or absence of the makeup specifying operation and the content. As a method of generating the virtual makeup image (face image on which makeup part image is superimposed) by makeup superimposing unit 162, known methods such as the methods described in PTL 1 and PTL 2 can be adopted.

Camera controller 170 controls various operations of camera 120 including the autofocus operation. Camera controller 170 causes AF unit 121 of camera 120 to start the autofocus operation, especially on condition that the item selection operation is performed. At this time, camera controller 170 sets the AF area of the face part corresponding to the selected makeup item as the focus position of the autofocus operation, based on the selected item information, information correspondence table 430 (refer to FIG. 6), and face part information table 410 (refer to FIG. 4). That is, camera controller 170 does not perform the autofocus operation unnecessarily, and performs the autofocus operation so that face parts corresponding to the selected makeup item are clearly displayed, when at least the item selection operation is performed.

Virtual makeup device 100 includes hardware such as a storage medium such as a central processing unit (CPU), a read only memory (ROM) that stores a control program, and a working memory such as a random access memory (RAM). In this case, the functions of each of the above units are realized by the CPU executing the control program.

With such a configuration, virtual makeup device 100 performs the autofocus operation at a timing when there is a high possibility that at least user 200 pays attention to any part of the face image, and can limit the autofocus operation at other timings.

<Operation of Device>

Next, an operation of virtual makeup device 100 will be described.

Figure 7:
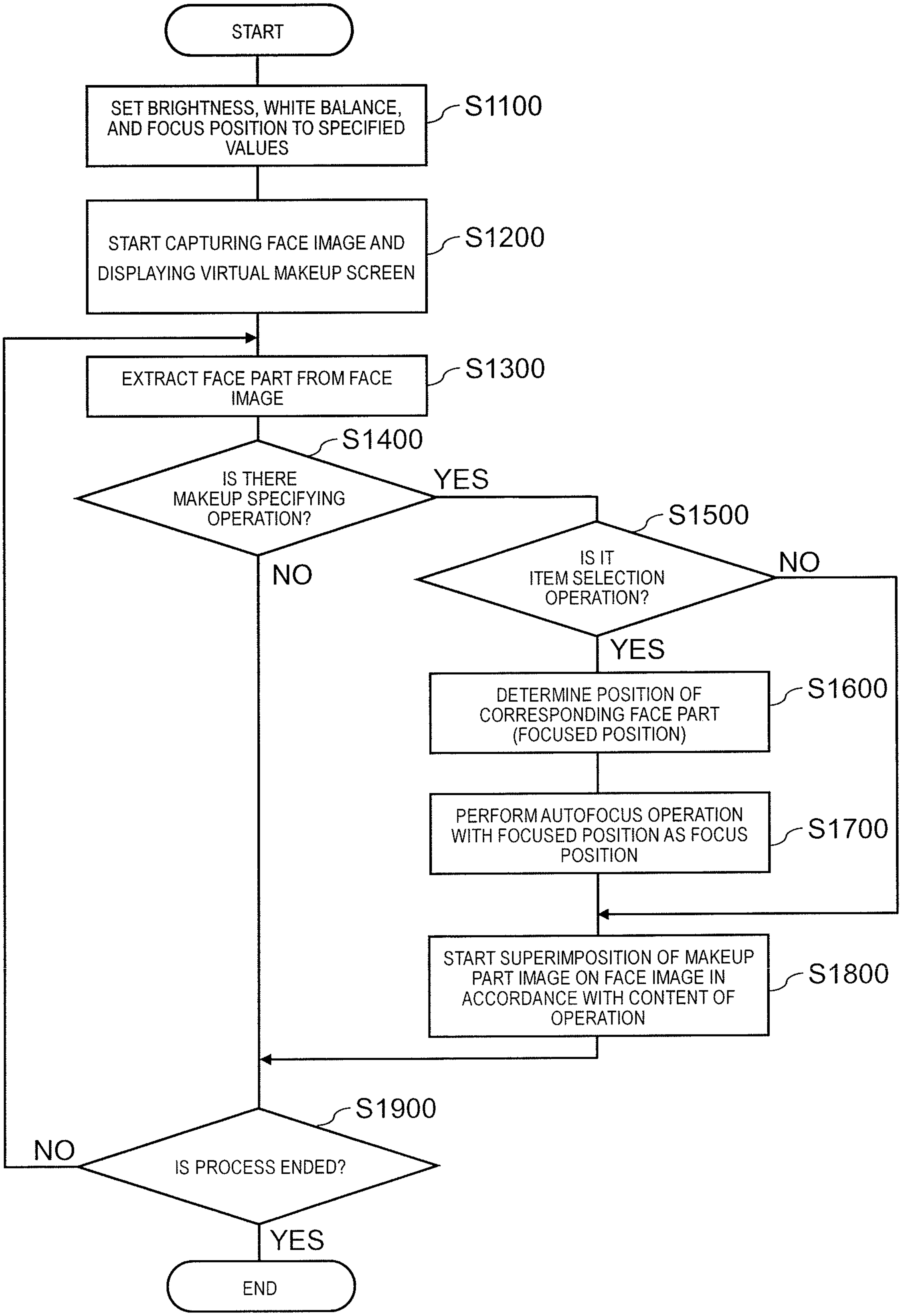
FIG. 7 is a flowchart illustrating an example of an operation of the virtual makeup device according to the present exemplary embodiment.

FIG. 7 is a flowchart illustrating an example of the operation of virtual makeup device 100.

In Step S1100, camera controller 170 sets the exposure (brightness), the white balance (color), and the focus position of camera 120 to specified values. The specified value is determined in accordance with the installation environment (ambient brightness or the like), for example, by a preliminary setup by an operator or the like at the time of installing virtual makeup device 100.

Although a position of the face of user 200 with respect to camera 120 is likely to change, in a case where the installation location is a store in particular, the position of the face does not change greatly in the surrounding lighting environment in many cases.

In Step S1200, camera 120, and camera 120 and display 130 with touch panel start imaging the face image and displaying virtual makeup screen 300 (refer to FIG. 2).

Virtual makeup device 100 repeatedly executes the process of subsequent Steps S1300 to S1900 at a predetermined cycle (for example, for each frame interval of face image).

In Step S1300, image processor 150 extracts the face part from the face image.

In Step S1400, operation reception unit 161 determines whether or not a makeup specifying operation is performed. In a case where the makeup specifying operation is not performed (S1400: NO), operation reception unit 161 advances the process to Step S1900 described later. In addition, in a case where the makeup specifying operation is performed (S1400: YES), operation reception unit 161 advances the process to Step S1500.

In Step S1500, operation reception unit 161 determines whether or not the performed makeup specifying operation is an item selection operation (predetermined makeup specifying operation). In a case where the performed makeup specifying operation is an item selection operation (S1500: YES), operation reception unit 161 advances the process to Step S1600. In addition, in a case where the performed makeup specifying operation is an operation other than the item selection operation (S1500: NO), operation reception unit 161 advances the process to Step S1800 described later.

In Step S1600, camera controller 170 determines the position of the face part (AF area, hereinafter referred to as "focused position") corresponding to the makeup item selected by the item selection operation.

In Step S1700, camera controller 170 causes AF unit 121 to perform the autofocus operation with the focused position as the focus position. Camera controller 170 does not basically instruct the autofocus operation at the timing other than Step S1700.

While the autofocus operation is performed, display controller 160 may display a face still image obtained from a face image imaged before the autofocus operation is started in image display area 310 of virtual makeup screen 300 instead of the stream data of the face image. As a result, it is possible to prevent the face image in image display area 310 from suddenly becoming unclear, and to reduce discomfort given to user 200.

In Step S1800, makeup superimposing unit 162 starts generation of a makeup part image according to the content of the virtual makeup specified by the makeup specifying operation and superimposition of the makeup part image on the face image. In a case where the superimposition of the makeup part image is already started, makeup superimposing unit 162 changes the state of the virtual makeup image in accordance with the content of the last makeup specifying operation.

In Step S1900, camera 120 (or another device unit) determines whether or not the end of the process related to the virtual makeup is instructed by the operation of user 200 or the like. In a case where the end of the process is not instructed (S1900: NO), camera 120 returns the process to Step S1300. In addition, in a case where the end of the process is instructed (S1900: YES), camera 120 ends the series of processes.

With such an operation, virtual makeup device 100 can display the virtual makeup image that follows the change of the face image while limiting the execution of the autofocus operation to the timing when the item selection operation is performed.

Camera controller 170 may adjust a focal length of the camera based on the change in the size of the face (such as width and area of face area) on the face image after the autofocus operation is completed after the item selection operation is performed.

In this case, for example, image processor 150 periodically determines the size of the face on the face image and outputs the determination result to camera controller 170. The size of the face can be determined, for example, by calculating the area of skin color area or the distance between the centers of the left and right pupils. Camera controller 170 estimates the focal length that focuses on the current face position, based on the change in the size of the face (for example, ratio of sizes) immediately after the last autofocus operation is performed and the focal length determined by the previous autofocus operation. In this case, it is preferable that camera controller 170 previously holds a table illustrating the position after the adjustment of the focus lens for each pattern of change in the size of the face.

In addition, even before the item selection operation is performed, camera controller 170 may cause AF unit 121 to perform the autofocus operation. However, it is preferable that camera controller 170 increases the frequency of the autofocus operation before the item selection operation as compared with the frequency of the autofocus operation after the item selection operation is performed.

In addition, in a case where a predetermined condition is satisfied, camera controller 170 may not perform the autofocus operation even if an item selection operation is performed. The predetermined condition includes, for example, the fact that the elapsed time from the timing at which the previous autofocus operation was performed (hereinafter, referred to as "previous AF timing") is small, the fact that the movement of the face from the last AF timing is small, the fact that there is little change in the size of the face from the previous AF timing, and the like.

<Effect of Present Exemplary Embodiment>

As described above, virtual makeup device 100 according to the present exemplary embodiment, includes display controller 160 that receives the makeup specifying operation for specifying the content of virtual makeup on the face image in a state where the face image imaged by camera 120 having the autofocus function is displayed, and camera controller 170 for starting the autofocus operation of camera 120 on condition that the predetermined makeup specifying operation is performed.

That is, virtual makeup device 100 according to the present exemplary embodiment limits the AF process of camera 120 in conjunction with the virtual makeup process in real time virtual makeup. In this manner, virtual makeup device 100 according to the present exemplary embodiment makes it possible to perform the virtual makeup on the face images more comfortably.

<Modification of Present Exemplary Embodiment>

The predetermined makeup specifying operation as the trigger of the autofocus operation is not limited to the item selection operation, and may be, for example, an operation instructing start of the display of operation reception area 320 to start the virtual makeup.

In addition, the makeup part and the face part that are targets of the virtual makeup are not limited to the above examples. Virtual makeup device 100 may include a wig, a color contact, tattoo, eyeglasses, accessories, a special makeup, and the like in the makeup part that is target of the virtual makeup. In this case, it is preferable that virtual makeup device 100 previously holds information indicating which face part needs to be focused for each makeup part.

In addition, the virtual makeup device is not limited to a tablet type terminal, and may be a smartphone or a personal computer, for example.

In addition, the contact detection target by the touch panel is not limited to a finger, and may be a stylus, for example.

In addition, the operation reception unit may receive the makeup specifying operation through a touch panel separated from the display, a mouse, a keyboard, a dedicated input device in which each area of operation reception area 320 is replaced by a large number of key switches or the like, or an operation interface by sight line detection.

In addition, a portion of a configuration of the virtual makeup device may be physically separated from other parts of the configuration of the device. In this case, it is necessary for each of a plurality of these separated portions to have a communication unit for communicating with each other.

<Summary of Present Disclosure>

The virtual makeup of the present disclosure includes the display controller that receives the makeup specifying operation for specifying the content of the virtual makeup on the face image imaged by the camera having the autofocus function in a state where the face image is displayed, and the camera controller that causes the camera to start the autofocus operation on condition that a predetermined makeup specifying operation is performed.

In the above virtual makeup device, the camera controller may reduce the frequency of the autofocus operation before the predetermined makeup specifying operation is performed as compared with the frequency of the autofocus operation after the predetermined makeup specifying operation is performed.

In addition, in the above virtual makeup device, the camera controller may not cause the autofocus operation to be started until the predetermined makeup specifying operation is performed.

In addition, in the above virtual makeup device, the predetermined makeup specifying operation may include the item selection operation for selecting the makeup item serving as a virtual makeup part on the face image and previously associated with the face part, and the camera controller may set a position, of the face part corresponding to the selected makeup item, corresponding to a position on the face image as a focus position of the autofocus operation.

In addition, in the above virtual makeup device, the display controller may superimpose and display a makeup part image of the selected makeup item on a position of the corresponding face part on the displayed face image.

In addition, in the above virtual makeup device, the display controller may display the face still image obtained from the face image before the autofocus operation is started, instead of the face image acquired while the autofocus operation is performed.

In addition, in the above virtual makeup device, the camera controller may adjust a focal length of the camera based on a change in a size of a face on the face image after the autofocus operation to be performed after the predetermined makeup specifying operation is performed is completed.

The virtual makeup method of the present disclosure includes a step of starting display of a face image imaged by a camera having an autofocus function and receiving a makeup specifying operation for specifying a content of a virtual makeup on the face image; and a step of causing the camera to start an autofocus operation on condition that a predetermined makeup specifying operation is performed.

A virtual makeup program of the present disclosure includes a step of starting a display of a face image imaged by a camera having an autofocus function and receiving a makeup specifying operation for specifying a content of a virtual makeup on the face image, and a step of starting an autofocus operation of the camera on condition that the predetermined makeup specifying operation is performed.

INDUSTRIAL APPLICABILITY

The virtual makeup device, the virtual makeup method, and the virtual makeup program according to the present disclosure is useful as a virtual makeup device, a virtual makeup method, and a virtual makeup program that make it possible to perform the virtual makeup on the face image more comfortably.

REFERENCE MARKS IN THE DRAWINGS

100 VIRTUAL MAKEUP DEVICE
110 CASING
120 CAMERA
121 AF UNIT
130 DISPLAY WITH TOUCH PANEL
140 INFORMATION STORAGE UNIT
150 IMAGE PROCESSOR
160 DISPLAY CONTROLLER
161 OPERATION RECEPTION UNIT
162 MAKEUP SUPERIMPOSING UNIT
170 CAMERA CONTROLLER

The invention claimed is:

1. A virtual makeup device comprising:

a display controller that receives a makeup specifying operation for specifying a content of a virtual makeup, and controls a display to apply virtual makeup on a face image in a first area of a displayed image on the display corresponding to the received makeup specifying operation, wherein the displayed image includes the first area displaying the face image being produced by a camera with an autofocus function and a second area displaying selectable contents for the makeup specifying operation; and a camera controller that causes, when receiving the makeup specifying operation conducted on the second area of the displayed image, the camera to start an autofocus operation autofocusing on a face corresponding to the face image in the first area of the displayed image.

2. The virtual makeup device of claim 1, wherein the camera controller reduces a frequency of the autofocus operation before the makeup specifying operation is performed as compared with a frequency of the autofocus operation after the makeup specifying operation is performed.

3. The virtual makeup device of claim 1, wherein the camera controller does not cause the autofocus operation to be started until the makeup specifying operation is performed.

4. The virtual makeup device of claim 1, wherein the makeup specifying operation includes an item selection operation for selecting a makeup item serving as a virtual makeup part on the face image and previously associated with a face part of the face, and the camera controller sets a position, of the face part of the face corresponding to the selected makeup item, corresponding to a position on the face image of the face as a focus position of the autofocus operation.

5. The virtual makeup device of claim 4, wherein the display controller superimposes and displays a makeup part image of the selected makeup item on a position of the corresponding face part on the displayed face image.

6. The virtual makeup device of claim 1, wherein the display controller displays a face still image obtained from the face image before the autofocus operation is started, instead of the face image acquired while the autofocus operation is performed.

7. The virtual makeup device of claim 1, wherein the camera controller adjusts a focal length of the camera based on a change in a size of the face corresponding to the face image after the autofocus operation to be performed after the makeup specifying operation is performed is completed.

8. A virtual makeup method of a virtual makeup device comprising:

starting display of a face image imaged by a camera having an autofocus function on a display of the virtual makeup device;

receiving with the virtual makeup device a makeup specifying operation for specifying a content of a virtual makeup on the face image;

controlling the display to apply the virtual makeup on the face image in a first area of a displayed image on the display corresponding to the received makeup specifying operation, wherein the displayed image includes the first area displaying the face image being produced by the camera and a second area displaying selectable contents for the makeup specifying operation; and causing the camera to start an autofocus operation autofocusing on a face corresponding to the face image in the first area of the displayed image when the virtual makeup device receives the makeup specifying operation conducted on the second area of the displayed image.

9. The virtual makeup device of claim 1, wherein the display displays the face image in real time.

10. The virtual makeup device of claim 1, wherein the second area of the displayed image comprises:

an item selection area displaying a plurality of selectable makeup subareas, each corresponding to a different selectable virtual makeup item, wherein selection of a makeup subarea with a selection operation selects a virtual makeup item for application to the face image by the display controller;

a color selection area displaying a plurality of selectable makeup colors; and a style selection area displaying a plurality of icons representing a plurality of makeup application shapes for applying the virtual makeup items applied by the display controller.

11. The virtual makeup device of claim 10, wherein the second area of the displayed image further comprises:

a process selection area displaying a plurality of process subareas, each of which corresponds to a different process performed with respect to the selected virtual makeup device, the plurality of process subareas comprising a set and reset icon, a compare icon, a save icon, and a quit icon.

12. The virtual makeup device of claim 10, wherein the second area of the displayed image further comprises:

a process selection area, which when selected, instructs a preview display process displaying a preview of a makeup part image of the selected virtual makeup.

13. The virtual makeup device of claim 10, wherein the item selection area hierarchically accepts the selection operation using a main classification and a sub-classification.

14. The virtual makeup device of claim 1, wherein the second area does not display the face image.

15. The virtual makeup device of claim 14, wherein the second area displays a plurality of selectable virtual makeup items to be applied to the face image, and the camera controller causes the camera to start an autofocus operation on the face corresponding to the face image displayed in the first area in response to selection of one of the plurality of virtual makeup items displayed in the second area.

16. The virtual makeup device of claim 15, wherein each selectable virtual makeup item in the second area is to be applied to a different part of the face image in the first area, and the camera controller autofocuses on a part of the face corresponding to the part of the face image in the first area to which the selected virtual makeup item is to be applied when the selected virtual makeup item is selected in the second area, thereby making the part of the face on which autofocusing is to be performed depend on the virtual makeup item that is selected.

17. The virtual makeup device of claim 1, wherein the camera controller controls the camera so as refrain from performing autofocusing on the face in the absence of the makeup specifying operation.

18. The virtual makeup device of claim 1, wherein the second area displays a plurality of selectable virtual makeup items to be applied to the face image, and the virtual makeup device further comprises:

a memory storing a face part information table identifying the part of the face on which the camera will autofocus in response to selection of each virtual makeup item.

19. The virtual makeup device of claim 18, wherein face part information table comprises:

a face part column, identifying a plurality of face parts;

an extraction information column, listing a different face part to be extracted from the face image for each face part in the face part column;

a reference face feature point column, listing different sets of face feature points in the area of each extracted face part in the extraction information column; and an autofocus area column, listing a different autofocus area for the camera for each set of face feature points in the reference face feature point column.

* * * * *